United States Patent [19]
Giuliano et al.

[11] Patent Number: 5,743,616
[45] Date of Patent: Apr. 28, 1998

[54] LED ILLUMINATED IMAGE DISPLAY

[76] Inventors: Ronald Giuliano, 103-25 68th Ave., Forest Hills, N.Y. 11375; Alexander Asianov, 504 E. 81st St., Suite 1F, New York, N.Y. 10028

[21] Appl. No.: 578,453

[22] Filed: Dec. 26, 1995

[51] Int. Cl.⁶ .................................................. F21V 13/04
[52] U.S. Cl. ................ 362/31; 362/27; 362/231; 362/245; 362/251; 362/800; 362/812
[58] Field of Search ............................. 40/546, 582, 583; 362/26, 27, 31, 251, 800, 812, 230, 231, 235, 242–245, 327

[56] References Cited

U.S. PATENT DOCUMENTS

| | | | |
|---|---|---|---|
| 1,930,359 | 10/1933 | Hilgenberg | 40/546 |
| 1,937,957 | 12/1933 | Hotchner | 40/546 |
| 3,267,598 | 8/1966 | Olesen et al. | 40/546 |
| 4,555,694 | 11/1985 | Yanagishima et al. | 362/31 |
| 4,974,354 | 12/1990 | Hembrook, Jr. | 362/31 |
| 5,124,890 | 6/1992 | Choi et al. | 362/27 |
| 5,239,450 | 8/1993 | Wall | 362/31 |
| 5,375,043 | 12/1994 | Tokunaga | 362/31 |

*Primary Examiner*—Alan Cariaso
*Attorney, Agent, or Firm*—Graham & James LLP

[57] ABSTRACT

An LED illuminated image display comprised of one or more thin, integral panels of light transmitting material (e.g., clear or translucent plastic or glass), with each panel having at least one LED imbedded in an edge thereof. Light from the LED(s) directly impinges on and is diffused through the light transmitting material and to a surface of the panel, having its refractory parameters locally disrupted, such as by being scratched or integrally etched with an image rendering. The disruption, such as by etching, with depth and spacing control, is effected to change the refraction of a portion of the panel surface whereby intensity of directly impinging LED light transmitted therethrough is made to vary, whereby an image such as of an art rendering is perceptible. Combination of panels, utilizing switching timers provides for animation displays.

13 Claims, 2 Drawing Sheets

FIG. 3B
FIG. 3A
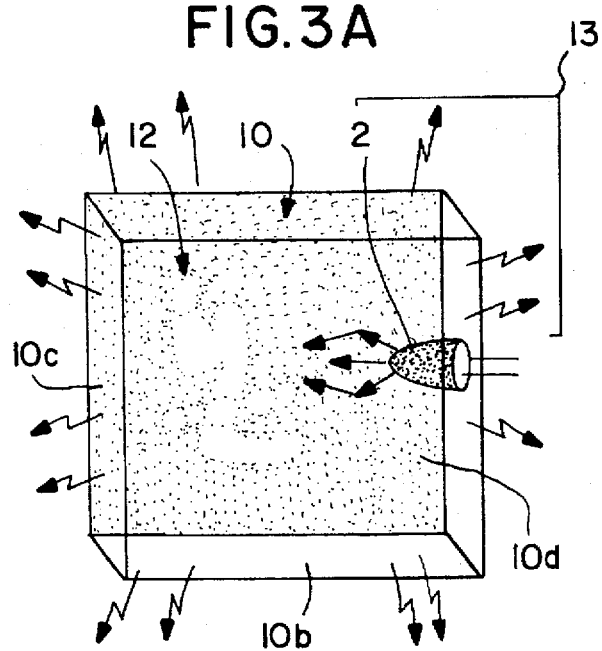
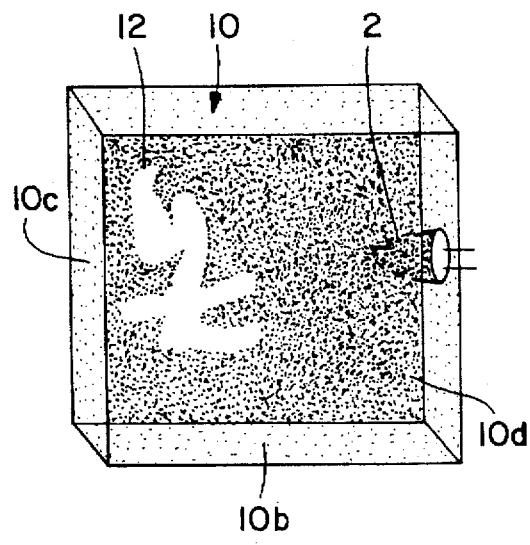
FIG. 4
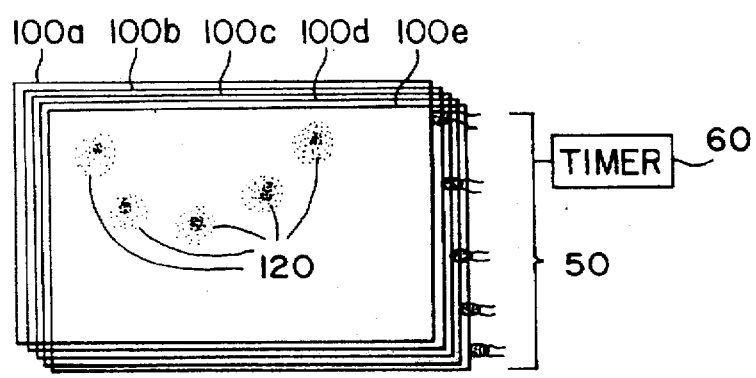

LED ILLUMINATED IMAGE DISPLAY

FIELD OF THE INVENTION

This invention relates to displays illuminated by LED lighting and particularly to flat panel displays having such lighting.

BACKGROUND OF THE INVENTION

Lighted displays have been used in the prior art wherein halogen or incandescent light is directed behind masks, in order to provide shadowed or lighted configurational designs. However, the use of halogen or incandescent lighting entails several undesirable features which include high operational cost, large size, excessive heating and the like. The lighting displays are also generally incapable of being utilized with multi-layer designs, which requires that each layer be provided with a separate illumination source.

The degree of heating inherent with such lighting sources also makes these lighted displays prohibitive for use in heat-sensitive applications, particularly in confined or indoor areas. Furthermore, when the displays are restricted in size, with closely confined light sources, they often also pose real fire hazards, such as when the lighting source is contained in a small insulated enclosure, e.g., of transparent glass or plastic, wherein heat becomes concentrated. Even without a fire hazard, the generated heat further contributes to frequent failure of the lighting sources, with the necessity for frequent replacement. Even lower heat generating lighting elements such as fluorescent bulbs have either been plagued by the same problems as incandescent light, though to a lesser degree, or have inherent problems of their own (e.g., harsh or otherwise unacceptable lighting) and when used, have been utilized in the form of separated lighting elements, with ventilation room, and design masks, and usually with light filters.

The direct use of lighting sources of lesser magnitude (and heat generation) has however been deemed to be unsatisfactory because of inadequate lighting. Low heat generating lighting elements, such as LED light bars, have accordingly been used in multiples and as backlighting elements for display masks such as exit signs.

It is an object of the present invention to provide compact, integral and economical LED illuminated image display such as of design art.

It is a further object of the present invention to provide such LED illuminated image display with an integrated display surface closely juxtaposed with the LED lighting source.

It is yet another object of the present invention to further provide the closely juxtaposed LED lighting source with light concentration means to provide sufficient light for configurational light intensity perception.

It is a further object of the present invention to provide such integral LED illuminated art with multiple layers having separate and separably illuminated image or art renderings.

These and other objects, features and advantages of the present invention will become more evident from the following discussion and drawings in which:

SHORT DESCRIPTION OF THE DRAWINGS

FIGS. 3a and 3b depict the flat panel of FIG. 1, with variations in light blockages along the side and back of the display panel; and FIG. 4 depicts the juxtaposition of several stacked layers of the flat panel etched images as shown in FIG. 1.

SUMMARY OF THE INVENTION

Figure 1:
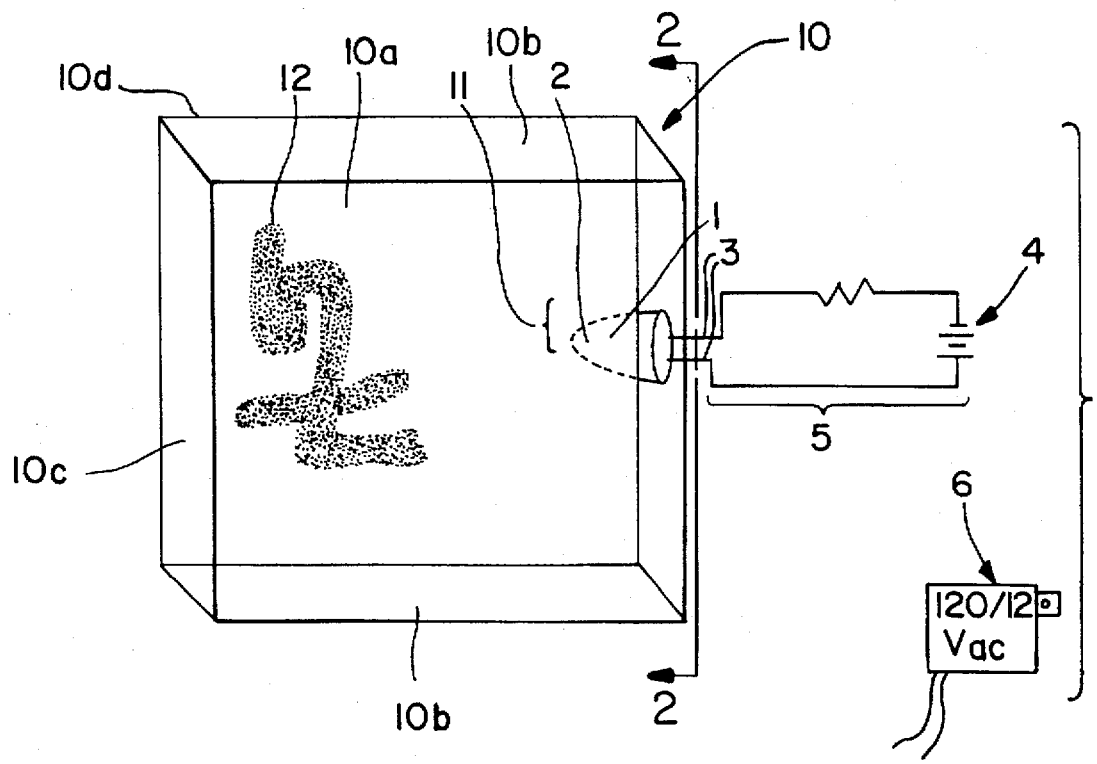
FIG. 1 depicts a flat panel etched image rendering with internal LED illumination, with the LED shown in phantom.

Generally the present invention comprises an LED illuminated image display comprised of one or more thin, integral panels of light transmitting material (e.g., clear or translucent plastic or glass), with each panel having at least one LED imbedded in an edge thereof, such that light from the LED(s) directly impinges on and is diffused through the light transmitting material and wherein a surface of the panel, substantially normal to the edge where the LED is inserted, has its refractory parameters locally disrupted, such as by being scratched or integrally etched with an image rendering. The disruption, such as by etching, is effected to change the refraction of a portion of the panel surface whereby intensity of directly impinging LED light transmitted therethrough is made to vary, whereby an image such as of an art rendering is perceptible. The term "art" as used herein represents predetermined, non-random image or images of a specific configurational appearance. The thickness of the panels is preferably at least that of the thickness of an LED but preferably not more than three times the thickness of the LED, in order to maximize light concentration from a low lumen light source. Alternatively, with very thin panels it is possible to channel LED light into panels of thicknesses of less than that of the thickness of an LED.

It has been discovered that by close and direct juxtaposition of panels, of transparent or translucent materials such as glass or plastics, with panel edge placed LEDs, there is sufficient lighting to provide illuminated images with discernible gradations. This differs markedly in perception from merely providing a diffused illumination light source through a randomly etched surface.

DETAILED DESCRIPTION OF THE INVENTION

In accordance with the present invention, a thin, light conducting panel comprised of a material such as translucent or transparent glass or plastic, has one or more cavities formed in the narrow edges thereof. An LED is inserted in each of the cavities, in a light directing position, as required for the desired mode of illumination of the etched art image. This direction is primarily with the bulb portion of the LED being parallel to the etching. Perpendicular placement of LEDs in the edges or surface opposite that of image may optionally be used in conjunction with the edge placed LEDs for special lighting effects, as desired.

Transparent or translucent potting material such as ethylene chloride is preferably utilized in fixing the LEDs in position within the cavities, while minimizing loss in light conductance and maximizing LED to surface contact.

To enhance light concentration and to minimize light loss from each of the LEDs to the art image rendering, the distance, from the plane passing through the LED, to the etched surface is preferably no more than the approximate thickness of the LED. In addition, it is preferred that the surface of the panel (in an embodiment of an art rendering comprising a single panel) opposite the etched surface be mirrored to prevent loss of light. Similarly, edges may be mirrored to further limit light loss. As an ultimate in light concentration, all areas of the panel may be made light impermeable such as by mirroring except for the etched area.

Variations in the above arrangements may be made to achieve different artistic effects. With a disruption of the refractory parameters of a portion of the panel surface there is a capture of incident light and a visible fluorescence. Variations in the perceived fluorescence is achieved by varying the degree of disruption. Thus, closely spaced or deeper etchings are highly fluorescent as compared to spaced apart and shallow etchings. Overall fluorescing is increased by mirroring of the non-disrupted surfaces, as described above. By mirroring of all surfaces and exposure only of the disrupted or etched area, fluorescence is maximized, with contrast against a dark background. Leaving both the etched and opposite surface faces un-mirrored provides an ethereally floating image in a darkened room. Leaving the edges unmirrored results in the formation of a lighted frame for the image. Insertion of an LED directly into the light conducting surface, serves to minimize light loss from lens diffusion. The use of several LEDs offset from each other in different planes relative to the etched surface, permits the production of animation effects with sequential lighting and shutting off of the LEDs. Similarly, different colored LEDs can be used to achieve varying aesthetic effects; when used with timed switches. Colored LEDs or colored translucent panels are also useful for providing greater visibility of the image in daylight.

In a further embodiment of the present invention, two or more panels are superimposed, with each of the panels, except (optionally) the bottommost panel, being fully light conductive (unmirrored faces and opposite side surfaces) and wherein each panel has its own edge illumination. By appropriate positioning of each of the refractory disruptions on each of the panels relative to each other, and by sequential lighting and light extinguishing, a fully animated effect is achievable. It may however be necessary to use more LED light sources in the lower panels to maintain full relative illumination and to compensate from light loss through the multitude of layers. Because of the low power requirements of LEDs, the panels may be readily powered by small rechargeable batteries or even with small solar cells and rechargeable batteries. Though flat panels are useful for many stand-alone applications, conformable and thin, non-flat panel configurations may be constructed for applications in which the panel or panels is or are adhered to non flat or non-linear surfaces.

The following examples are presented as being indicative of the ability to control light intensity by use of reflective mirror placement and degree of refractory disruption, specifically with depth of etching. It is understood that such examples are merely illustrative in nature and details contained therein are not to be construed as limitations on the present invention.

EXAMPLE 1

A red LED of known light intensity (500 mcd) was imbedded in the edge of a clear plastic panel having a letter image etched thereon. Emitted light intensity was measured at a distance of 3 inches from the 500 mcd LED, with the following results, given in Table form:

TABLE

| Etched surface | 25 mcd |
| Deeper etching | 32 mcd |
| Opposite surface mirror backing | 34.5 mcd |
| Edge mirror backing | 32 mcd |
| Opposite and edge mirror backing | 50 mcd |

DETAILED DESCRIPTION OF THE DRAWINGS AND THE PREFERRED EMBODIMENT

Figure 2:
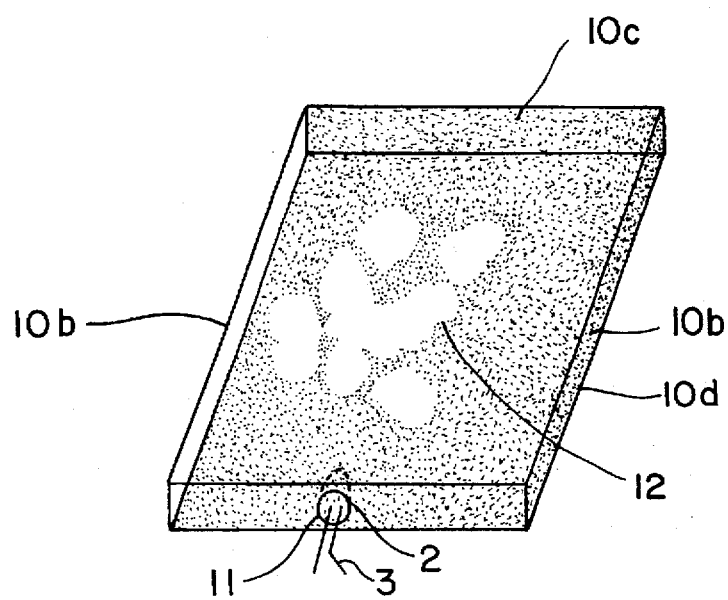
FIG. 2 is a cross section view taken along line 2—2 of the panel shown in FIG. 1, showing the LED placement.

With reference to the drawings, in FIG. 1, a solid panel 10 of a clear plastic is provided with edge cavities 11 into which LED elements 1 are embedded and potted into placed by transparent potting material 2. Electrical wires 3 extend from the LEDs to provide the minimal power required for the LED elements 1, from any of the power sources of battery 4, solar cell 5, or hard wired power supply 6. Upper surface 10a of panel 10 is etched with an art rendering 12. As better shown in FIG. 2, side walls 10b and 10c are mirrored as is bottom surface 10d. As a result, LED source light is redirected toward art rendering 12 for the enhanced fluorescing thereof. In FIG. 3a, regardless of whether the bottom or back surface 10d is mirrored, blacked, or remains clear, a frame halo 13 is formed to frame fluorescing art rendering 12. In FIG. 3b, with all the surfaces or edges of the panel 10 being blackened or mirrored, aside from directly adjacent art rendering 12, such art rendering appears to float in low ambient lighting conditions.

The embodiment shown in FIG. 4, is that of stacked panel 100a–e, with each of the panels being individually provided with LED lighting elements 50. The etched art rendering 120, shown as a ball, in each panel, is offset positioned from that of the adjacent panel. Thus, with sequential current providing element 60, with timing means, there is an animation display of a lighted ball describing a circular orbit, It is understood that the above discussion and drawings are exemplary of the present invention and that changes may be made in type and configuration of elements and the interrelation thereof without departing from the scope of the present invention as defined in the following claims.

What is claimed is:

1. An illuminated image display comprising at least one thin, integral solid panel of light transmitting material having a front image display surface, a rear surface opposite thereto and edge surfaces between said front and rear surfaces, wherein at least one light emitting diode (LED) is embedded in an edge of said panel, such that light from the at least one light emitting diode (LED/directly impinges on and is directly diffused through the light transmitting material and wherein a portion of the front image display surface of the panel, has its refractory parameters locally disrupted, in a controlled manner, wherein the refractory parameters are locally disrupted by etching of the display surface and wherein different parts of a desired non-random image are made to be perceptibly illuminated by varying light intensity by variation in at least one of etching depth and spacing between etchings, said etchings being configured to be in the shape of the non-random image, to change the refraction of at least one portion of the front panel surface whereby intensity of directly impinging light emitting diode (LED) light transmitted therethrough is made to vary, whereby the non-random image of a pre-determined specific configurational appearance is perceptible.

2. The illuminated image display of claim 1, wherein said rear surface is mirrored.

3. The illuminated image display of claim 1, wherein said edges are mirrored.

4. The illuminated image display of claim 2, wherein said front surface is mirrored except in said portion where the image is perceptible.

5. The illuminated image display of claim 1, wherein the thickness of the panels, as defined by the distance between the front and rear surfaces, is at least that of the thickness of a light emitting diode (LED) and not more than three times the thickness of the one or more light emitting diodes (LED) imbedded in the edges of the panel.

6. The illuminated image display of claim 1, wherein said light emitting diodes (LEDs) are powered by a battery.

7. The illuminated image display of claim 1, wherein said light emitting diodes (LEDs) are powered by a solar cell.

8. The illuminated image display of claim 1, wherein said light transmitting material is comprised of a member of the group consisting of glass and plastic.

9. The illuminated image display of claim 5, wherein said one or more light emitting diodes (LEDs) imbedded in the light transmitting material are potted in place with a light transmitting potting material.

10. The illuminated image display of claim 1, wherein said display comprises at least two light emitting diodes (LEDs) which are positionally offset from each other in different planes, relative to the display surface, and wherein said display further comprises timed switching means to provide animation effects with sequential lighting and shutting off of the at least two light emitting diodes (LEDs).

11. The illuminated image display of claim 1, wherein said display comprises at least two light emitting diodes (LEDs) which are different colored and wherein said display further comprises timed switching means to provide aesthetic effects with sequential lighting and shutting off of the at least two differently colored light emitting diodes (LEDs).

12. An illuminated image display comprising at least two panels of claim 1, superimposed on each other whereby the predetermined specific configurational appearance on each panel is separately perceptible.

13. The illuminated image display of claim 12, wherein the display further comprises timed switching means electrically connected to the light emitting diodes (LEDs) of each of the panels to provide separate timed and controlled activation of the light emitting diodes (LEDs) as desired, with separate lighted display of the configurational appearances on each of the panels.

* * * * *

(12) EX PARTE REEXAMINATION CERTIFICATE (9235th)
United States Patent
Giuliano et al.

(10) Number: US 5,743,616 C1
(45) Certificate Issued: Aug. 28, 2012

(54) LED ILLUMINATED IMAGE DISPLAY

(75) Inventors: Ronald Giuliano, Forest Hills, NY (US); Alexander Asianov, New York, NY (US)

(73) Assignee: Lumino Designs, Inc., New Hyde Park, NY (US)

Reexamination Request:
No. 90/010,126, Apr. 17, 2008

Reexamination Certificate for:
Patent No.: 5,743,616
Issued: Apr. 28, 1998
Appl. No.: 08/578,453
Filed: Dec. 26, 1995

(51) Int. Cl.
*F21V 13/04* (2006.01)

(52) U.S. Cl. .............................. 362/31; 362/27; 362/231; 362/245; 362/251; 362/800; 362/812

(58) Field of Classification Search ........................ None
See application file for complete search history.

(56) References Cited

To view the complete listing of prior art documents cited during the proceeding for Reexamination Control Number 90/010,126, please refer to the USPTO's public Patent Application Information Retrieval (PAIR) system under the Display References tab.

*Primary Examiner* — Tuan H Nguyen

(57) ABSTRACT

An LED illuminated image display comprised of one or more thin, integral panels of light transmitting material (e.g., clear or translucent plastic or glass), with each panel having at least one LED imbedded in an edge thereof. Light from the LED(s) directly impinges on and is diffused through the light transmitting material and to a surface of the panel, having its refractory parameters locally disrupted, such as by being scratched or integrally etched with an image rendering. The disruption, such as by etching, with depth and spacing control, is effected to change the refraction of a portion of the panel surface whereby intensity of directly impinging LED light transmitted therethrough is made to vary, whereby an image such as of an art rendering is perceptible. Combination of panels, utilizing switching timers provides for animation displays.

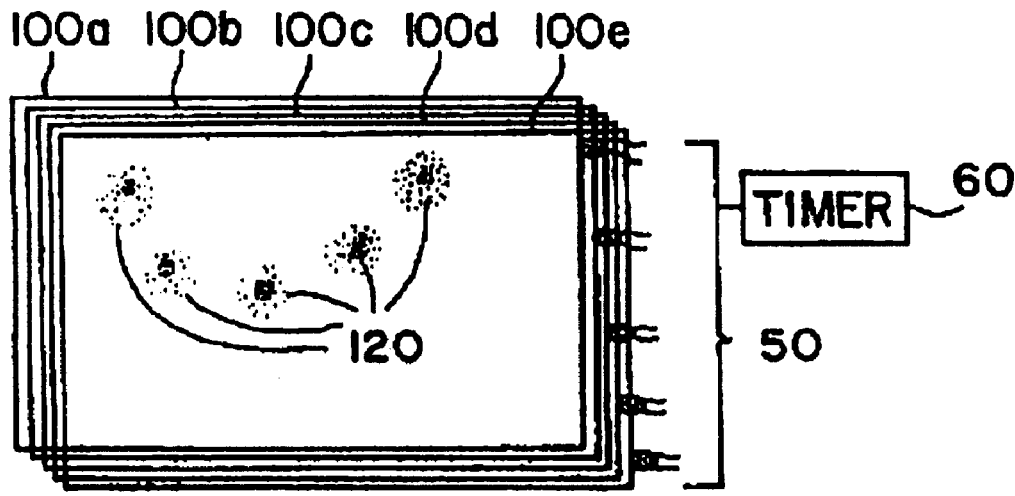

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 5, 6 and 8 are cancelled.
Claims 2-4, 7 and 9-13 were not reexamined.

\* \* \* \* \*